(12) United States Patent
Odedra et al.

(10) Patent No.: US 12,160,157 B2
(45) Date of Patent: Dec. 3, 2024

(54) DEFLECTOR FOR ROTATING ELECTRICAL MACHINE

(71) Applicant: Cummins Generator Technologies Limited, Peterborough (GB)

(72) Inventors: Anand Odedra, Peterborough (GB); Perry Saunders, Peterborough (GB); Richard J. Gray, Peterborough (GB)

(73) Assignee: Cummins Generator Technologies Limited, Peterborough (GB)

( * ) Notice: Subject to any disclaimer, the term of this patent is extended or adjusted under 35 U.S.C. 154(b) by 511 days.

(21) Appl. No.: 17/426,397

(22) PCT Filed: Jan. 22, 2020

(86) PCT No.: PCT/GB2020/050138
§ 371 (c)(1),
(2) Date: Jul. 28, 2021

(87) PCT Pub. No.: WO2020/157464
PCT Pub. Date: Aug. 6, 2020

(65) Prior Publication Data
US 2022/0109344 A1 Apr. 7, 2022

(30) Foreign Application Priority Data

Jan. 30, 2019 (GB) .................................... 1901267

(51) Int. Cl.
*H02K 9/04* (2006.01)
*H02K 1/20* (2006.01)
(Continued)

(52) U.S. Cl.
CPC ................ *H02K 9/04* (2013.01); *H02K 1/20* (2013.01); *H02K 5/18* (2013.01); *H02K 5/20* (2013.01);
(Continued)

(58) Field of Classification Search
CPC .. H02K 5/18; H02K 5/20; H02K 1/20; H02K 9/00; H02K 9/02; H02K 9/04; H02K 9/06;
(Continued)

(56) References Cited

U.S. PATENT DOCUMENTS

| | | | | |
|---|---|---|---|---|
| 3,610,975 | A | * 10/1971 | Onjanow | ................. H02K 9/18 416/93 R |
| 4,009,405 | A | * 2/1977 | Gleichman | .............. H02K 9/06 310/58 |
| 5,214,324 | A | 5/1993 | Holmes | |
| 2016/0254729 | A1 | 9/2016 | Grau Sorarrain et al. | |
| 2017/0025926 | A1 | 1/2017 | Lee | |

FOREIGN PATENT DOCUMENTS

| | | |
|---|---|---|
| EP | 2 860 853 | 4/2015 |
| JP | 2001-078391 | 3/2001 |

(Continued)

OTHER PUBLICATIONS

Examination Report on IN App. No. 202147038432 DTD Jan. 10, 2023.
(Continued)

*Primary Examiner* — Alexander A Singh
(74) *Attorney, Agent, or Firm* — Foley & Lardner LLP

(57) ABSTRACT

A deflector is disclosed for deflecting air flow in a rotating electrical machine comprising a stator (8), stator windings (10) and a housing (12). The deflector comprises a sheet of material folded to form a deflecting portion (42) and a connecting portion (44). The deflecting portion (42) is arranged to deflect airflow from a gap (14) between the stator and the housing towards the stator windings (10). The connecting portion comprises one or more apertures (48; 52; 54; 56; 58) adjacent to the deflecting portion. The aperture helps to reduce or avoid the Coandă effect, and thereby improve the impingement of cooling air on the stator end windings.

19 Claims, 6 Drawing Sheets

(51) Int. Cl.
*H02K 5/18* (2006.01)
*H02K 5/20* (2006.01)
*H02K 9/00* (2006.01)
*H02K 9/06* (2006.01)
*H02K 9/12* (2006.01)

(52) U.S. Cl.
CPC ................ *H02K 9/00* (2013.01); *H02K 9/06* (2013.01); *H02K 9/12* (2013.01)

(58) Field of Classification Search
CPC .. H02K 9/08; H02K 9/10; H02K 9/12; H02K 9/14; H02K 9/16; H02K 9/18; H02K 9/28
USPC ..... 310/52, 53, 55, 57, 58, 59, 60 R, 62, 63, 310/60 A, 64
See application file for complete search history.

(56) References Cited

FOREIGN PATENT DOCUMENTS

WO WO-2018/047515 3/2018
WO WO-2018/189523 10/2018

OTHER PUBLICATIONS

International Search Report and Written Opinion for International Application No. PCT/GB2020/050138, mail date Apr. 2, 2020, 12 pages.
Search Report for GB Application No. 1901267.3, mail date Jul. 23, 2019, 4 pages.

* cited by examiner

DEFLECTOR FOR ROTATING ELECTRICAL MACHINE

CROSS-REFERENCE TO RELATED APPLICATIONS

The present application is a national stage entry under 35 U.S.C. § 371 of PCT/GB2020/050138 filed Jan. 22, 2020, which claims priority to United Kingdom Patent Application No. 1901267.3 filed Jan. 30, 2019, the contents of which are incorporated by reference herein in their entireties.

The present invention relates to a deflector for use with a rotating electrical machine, and in particular a deflector which is arranged to deflect air flow in order to assist with cooling of the machine.

Rotating electrical machines, such as motors and generators, generally comprise a rotor mounted on a shaft and arranged to rotate inside a stator. The rotor comprises a rotor core which holds rotor windings or permanent magnets. The rotor windings or permanent magnets produce a rotating magnetic field which crosses an air gap between the rotor and the stator. The stator comprises a stator core which holds stator windings which combine with the rotating magnetic field. The stator itself may be held within a stator frame.

When the machine is in operation, currents passing through the stator and/or rotor windings, as well as other factors such as friction and windage losses, may cause the machine to heat up. Therefore many machines, particularly those of a larger design, require some form of cooling. This may be achieved by providing a fan for forcing air flow through the machine. The fan may be mounted on the rotor shaft, or driven independently. Air flow through the machine is usually in a generally axial direction. The main paths for the air flow are through the rotor/stator airgap, and through an airgap between the stator core and the stator frame.

In known rotating electrical machines, as air flow exits the air gap between the stator core and the stator frame, it encounters a void. This void is caused by the presence of end windings which extend out of the stator core, and which require the stator frame to be longer than the stator core. The presence of a void causes eddy currents to be introduced into the airflow. This leads to pressure loss, reducing the air flow velocity, and resulting in a reduction in the transfer of heat to the cooling air. Furthermore, air flow exiting the stator/frame air gap may largely bypass the end windings. As a consequence, relatively little cooling of the end windings may be achieved.

In order to improve the cooling of stator end windings, it has been proposed to provide deflectors which redirect air flow from the stator/frame air gap towards the end windings. For example, WO 2018/189523 in the name of the present applicant, the subject matter of which is incorporated herein by reference, discloses a plurality of deflectors (baffles) which are provided at spaced locations circumferentially about the machine. Each deflector comprises a deflector plate, a connecting member and an attachment member. The deflector plate is presented to air flow from the stator/frame air gap at an angle of approximately 45°, so as to direct the air flow towards the stator end windings. The connecting member is used to connect the deflector plate to the attachment member. The attachment member is used to attach the deflector to the frame of the machine. The connecting member extends from the attachment member axially inside the frame, so as to position the deflector plate at a location facing an exit of the stator/frame air gap.

It has been found that the deflectors disclosed in WO 2018/189523 are effective in lowering the temperature of the stator end windings. Furthermore, assembly and maintenance of the machine is facilitated by providing a number of deflector plates in a spaced arrangement round the machine, rather than a continuous annular baffle. However, a disadvantage of the deflectors is that they include multiple parts and require various manufacturing processes such as punching, machining and welding. Therefore, the deflectors may be relatively complex and expensive to manufacture, which may add considerable extra cost to a standard machine.

According to a first aspect of the present invention there is provided a deflector for deflecting air flow in a rotating electrical machine comprising a stator, stator windings and a housing, the deflector comprising a sheet of material folded to form a deflecting portion and a connecting portion, wherein the deflecting portion is arranged to deflect airflow from a gap between the stator and the housing towards the stator windings, and the connecting portion comprises an aperture adjacent to the deflecting portion.

The present invention may provide the advantage that, by providing a deflector comprising a sheet of material folded to form a deflecting portion and a connecting portion, and providing the connecting portion with an aperture, the deflector may be relatively simple and cost-effective to manufacture while still providing appropriate redirection of the air flow.

If a folded deflector without an aperture were used, then there may be a tendency for air flow to follow the surface of the deflector due to the Coandă effect. This may reduce the effectiveness of the deflector in redirecting air flow. Thus, the aperture may be arranged to reduce the Coandă effect of air flow passing a surface of the deflector. This may help to ensure that air flow is redirected in the appropriate direction, such as towards stator end windings.

Preferably the aperture is located immediately after the deflecting portion in a direction of air flow. This may help to reduce the Coandă effect, and thus may help to ensure appropriate redirection of the air flow. For example, the aperture may be adjacent to or overlapping with a fold between the deflecting portion and the connecting portion.

In one embodiment, the aperture lies adjacent to a fold between the deflecting portion and the connecting portion. However, it has been found that improved results may be obtained if the aperture overlaps the fold (i.e. removes some or all of the material in the fold). Therefore, the aperture may remove at least some (and possibly all) of a fold between the deflecting portion and the connecting portion. For example, the fold may have a folding radius and the aperture may remove some or all of the folding radius.

The length of the aperture (in a direction of air flow) is preferably large enough to help reduce the Coandă effect, while leaving enough material to ensure that the connecting portion has sufficient strength. For example, the length of the aperture may be at least 10% or 20% and/or less than 90% or 80% of the length of the connecting portion, although other values could be used instead.

In one embodiment, a single aperture is provided. This can allow a relatively simple manufacturing process to be used.

The width of the aperture (in a direction perpendicular to the direction of air flow and/or tangential to a circumference of the machine) is preferably large enough to provide appropriate redirection of the air flow, while leaving enough material to ensure that the connecting portion has sufficient strength to support the deflecting portion. For example, the width of the aperture may be at least 50% of the width of the connecting portion, and preferably at least 60%, 70%, 75%, 80% or 85% of the width of the connecting portion. On the other hand, the width of the aperture may be less than 95% or less than 90% of the width of the connecting portion. Of course, it will be appreciated that other values may be used as appropriate in the circumstances.

In another embodiment, a plurality of apertures is provided. For example, two, three or more apertures may be provided across the width of the connecting portion. Each aperture may be located immediately after the deflecting portion in a direction of air flow and/or adjacent to or overlapping with a fold between the deflecting portion and the connecting portion. This may help to ensure that the connecting member has sufficient strength while still providing appropriate redirection of the air flow.

Where a plurality of apertures is provided, the total amount of material removed by the apertures is preferably large enough to provide appropriate redirection of the air flow, while leaving enough material to ensure that the connecting portion has sufficient strength to support the deflecting portion. For example, the sum of the widths of the apertures may be at least 50% of the width of the connecting portion, and preferably at least 60%, 70%, 75%, 80% or 85% of the width of the connecting portion.

The or each aperture may be any appropriate shape. For example, in one embodiment the aperture is rectangular. This may allow the aperture to be formed relatively easily, for example by punching. However, the aperture could be any other shape, for example, a circle, an ellipse or any other closed curve, or any type of polygon such as a triangle, a quadrilateral (for example a trapezium/trapezoid, an isosceles trapezium or a kite), a pentagon, a hexagon, or a polygon with any other number of sides. The aperture may have straight and/or curved sides.

In another embodiment, a plurality of circular holes is provided across the width of the connecting portion. This may allow the holes to be formed by punching or drilling.

In a further embodiment, the width of the aperture or apertures tapers inwards in a direction away from the deflecting portion. For example, the or each aperture may be a triangle, or trapezium (trapezoid) with a base of the triangle or trapezium running parallel to a fold between the deflecting portion and the connecting portion. This may provide improved aerodynamic performance, although potentially at the cost of some increased complexity.

It will be appreciated that any appropriate number and/or shape of aperture may be provided depending on the circumstances. In the case of two or more apertures, each aperture may be the same as or different from the others.

In the case of an aperture with a straight edge, an edge of the aperture may run parallel to a fold between the deflecting portion and the connecting portion.

The aperture may be, for example, a hole which is punched or drilled in the deflector. The deflector may be made from any appropriate material such as metal or a heat resistant plastic.

Preferably the deflecting portion and/or the connecting portion are substantially flat. This can allow the deflector to be produced from a flat sheet of material, which may then be folded to form the deflecting portion and the connecting portion.

The deflecting portion may lie in a plane which is at an angle to a plane of the connecting portion. For example, the plane of the deflecting portion may be at an angle of least 20° or 30° and/or less than 70° or 60° to the plane of the connecting portion, although other values may be used instead. Preferably, the plane of the deflecting portion is at an angle of approximately 45° to the plane of the connecting portion.

Preferably, the deflecting portion is at an angle to an axial direction of the machine. For example, the deflecting portion may be an angle of approximately 45° to an axial direction of the machine. The deflecting portion is preferably arranged to deflect air flow from a substantially axial direction to a direction with at least a radial component. For example, the deflecting portion may be arranged to deflect air flow from a stator/housing air gap towards stator end windings.

An edge at the end of the deflecting portion may be curved. This may facilitate accommodation of the deflector inside an annular housing of the machine.

The connecting portion may be arranged to support the deflecting portion and/or to connect it to another component such as a part of the deflector and/or the machine.

Preferably the deflector further comprises an attachment portion for attaching the deflector to a housing of the machine. In this case, the connecting portion is preferably between the deflecting portion and the attachment portion.

The connecting portion may be arranged to extend from the attachment portion towards the inside of the housing so as to locate the deflecting portion inside the housing. For example, the connecting portion may locate the deflecting portion so as to face an exit of a stator/housing air gap and/or radially outwards of stator end windings. This may help to ensure appropriate redirection of the air flow.

The attachment portion is preferably at an angle to the connecting portion. For example, the sheet of material may be folded to form a transition between the connecting portion and the attachment portion. The angle between the two may be approximately 90° or some other angle.

Preferably the attachment portion comprises at least one hole for attaching the deflector to a housing of the machine.

When in use, the attachment portion preferably runs in a substantially radial direction, the connecting portion in a substantially axial direction, and/or the deflection portion at an angle (for example, 45°) to the axial direction.

The deflector may be arranged to extend through a segment of the machine, that is, it may extend through part but not all of the circumference of the machine. Thus, the deflector may be arranged such a plurality of deflectors can be provided in a spaced arrangement around a circumference of the machine.

According to another aspect of the invention there is provided a rotating electrical machine comprising a plurality of deflectors in any of the forms described above.

Preferably the machine comprises:
a stator with stator windings;
a housing; and
a fan for drawing air through the machine,
and the deflectors are arranged to deflect air flow exiting an air gap between the stator and the housing towards the stator windings.

Corresponding methods may also be provided. Thus, according to another aspect of the invention there is provided a method of deflecting air flow in a rotating electrical machine, the machine comprising a stator and a housing, the method comprising deflecting air flow exiting from an air gap between the stator and the housing towards stator windings using a deflector comprising a sheet of material folded to form a deflecting portion and a connecting portion, the connecting portion comprising an aperture adjacent to the deflecting portion. The aperture may reduce the Coandă effect of air flow passing a surface of the deflector.

Features of one aspect of the invention may be provided with any other aspect. Apparatus features may be provided with method aspects and vice versa.

In the present disclosure, terms such as "radially", "axially" and "circumferentially" are generally defined with reference to the axis of rotation of the rotating electrical machine unless the context implies otherwise.

Preferred embodiments of the present invention will now be described, purely by way of example, with reference to the accompanying drawings, in which.

Figure 1:
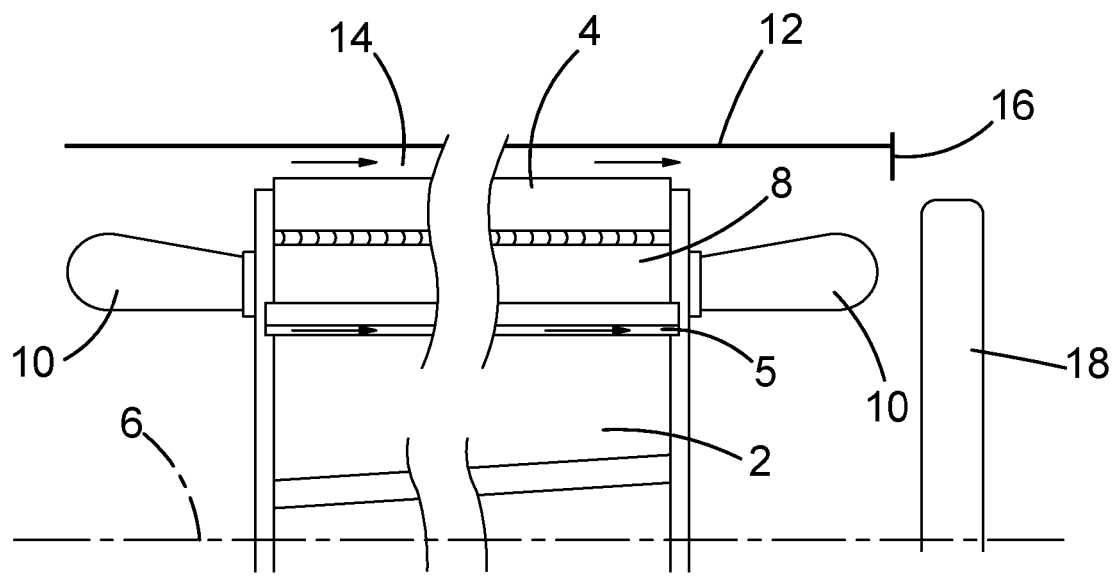
FIG. 1 is a radial cross section through part of a rotating electrical machine.

FIG. 1 is a radial cross section through part of a rotating electrical machine. The machine comprises a rotor 2 located inside a stator 4 with an air gap 5 between the two. The rotor 2 is mounted on a shaft with an axis of rotation indicated by the dashed line 6. The stator 4 comprises a stator core 8 with slots on its inner circumference in which are wound stator windings. The stator windings run through the slots in a substantially axial direction. End windings 10 extend out of the stator slots and around the outside of the stator core in a substantially circumferential direction.

The stator 4 is contained within a stator frame 12. Landing bars (not shown in FIG. 1) are attached to the stator frame 12. The landing bars run through the machine in an axial direction and engage with the stator core 8 on its outer circumference in order to locate the stator core within the stator frame. The landing bars create air gaps 14 between the stator core 8 and the stator frame 12. The stator frame 12 is terminated with an end plate 16.

A shaft-driven fan 18 is located at the drive end of the machine, in order to draw cooling air through the machine. This air flow is predominately in an axial direction through the rotor/stator air gap 5 and the stator/frame air gap 14, as indicated by the arrows in FIG. 1. If desired, an external, independently-driven fan or fans or any other appropriate means of forcing air through the machine could be used instead of a shaft driven fan.

Still referring to FIG. 1, it can be seen that a void is present at the exit of the air flow from the stator/frame air gap 14. This void is caused by the presence of the end windings 10, which requires the stator frame 12 to be longer than the stator core 8. It has been proposed to locate deflector plates within this void, in order to deflect air flow from the stator/frame air gap 14 towards the end windings 10. It has been found that such deflectors can help to improve the cooling of the machine by reducing the temperature of the end windings, and/or by reducing eddy currents in the void, thereby improving the air flow through the machine.

Figure 2:
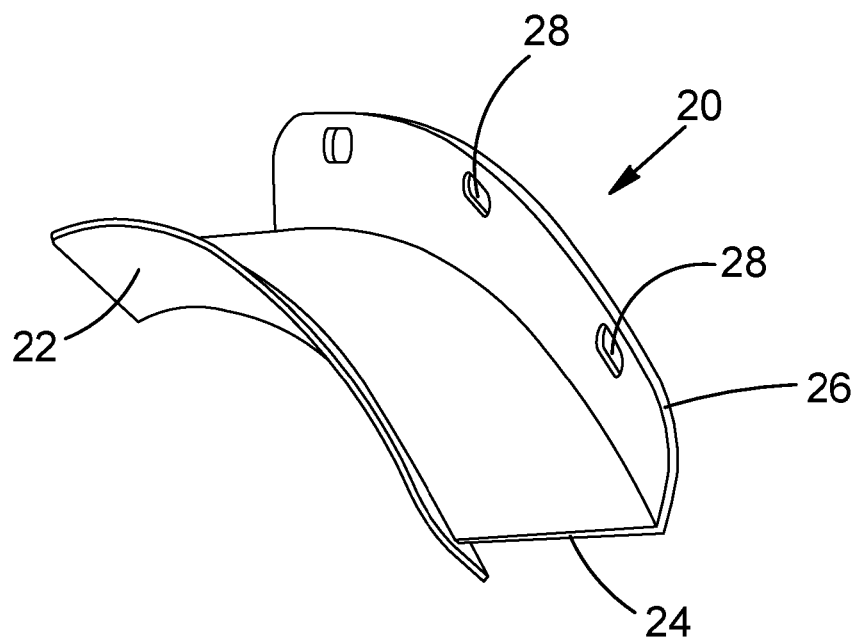
FIG. 2 shows a previously considered deflector design.

FIG. 2 shows a previously considered deflector design. Referring to FIG. 2, the deflector 20 comprises a deflector plate 22, a connecting member 24 and an attachment member 26. The deflector plate 22 is angled relative to the axis of the machine. The deflector plate 22 is connected to the attachment member 26 by means of the connecting member 24. The attachment member 26 comprises a plurality of bolt holes 28 which are used to connect the deflector to the stator frame. For example, the deflector may be connected to the end plate 16 of the stator frame 12 by means of bolts which pass through the bolt holes 28. The deflector 20 may be, for example, as disclosed in WO 2018/189523.

Figure 3:
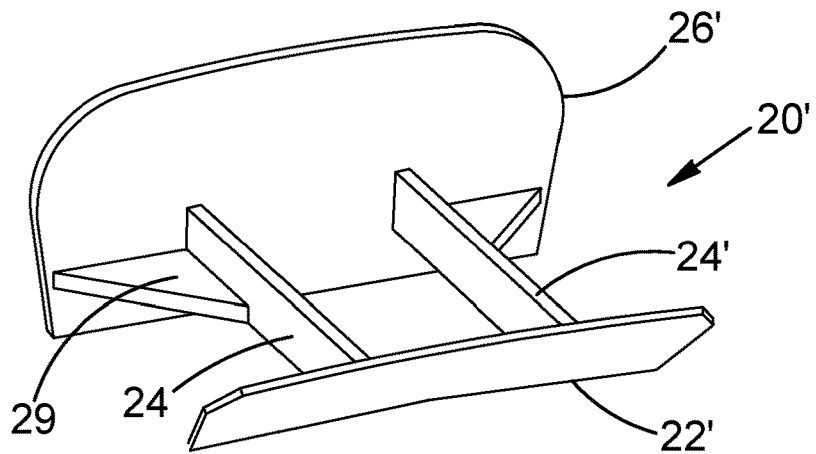
FIG. 3 shows another previously considered deflector design.

FIG. 3 shows another previously considered deflector design. In this arrangement, the deflector 20' comprises a deflector plate 22', two connecting members 24' and an attachment member 26'. Braces 29 are provided to strengthen the joints between the connecting members and the attachment member. In use, bolt holes (not shown in FIG. 3) are used to bolt the deflector to the stator frame, in a similar way to the arrangement of FIG. 2.

Figure 4:
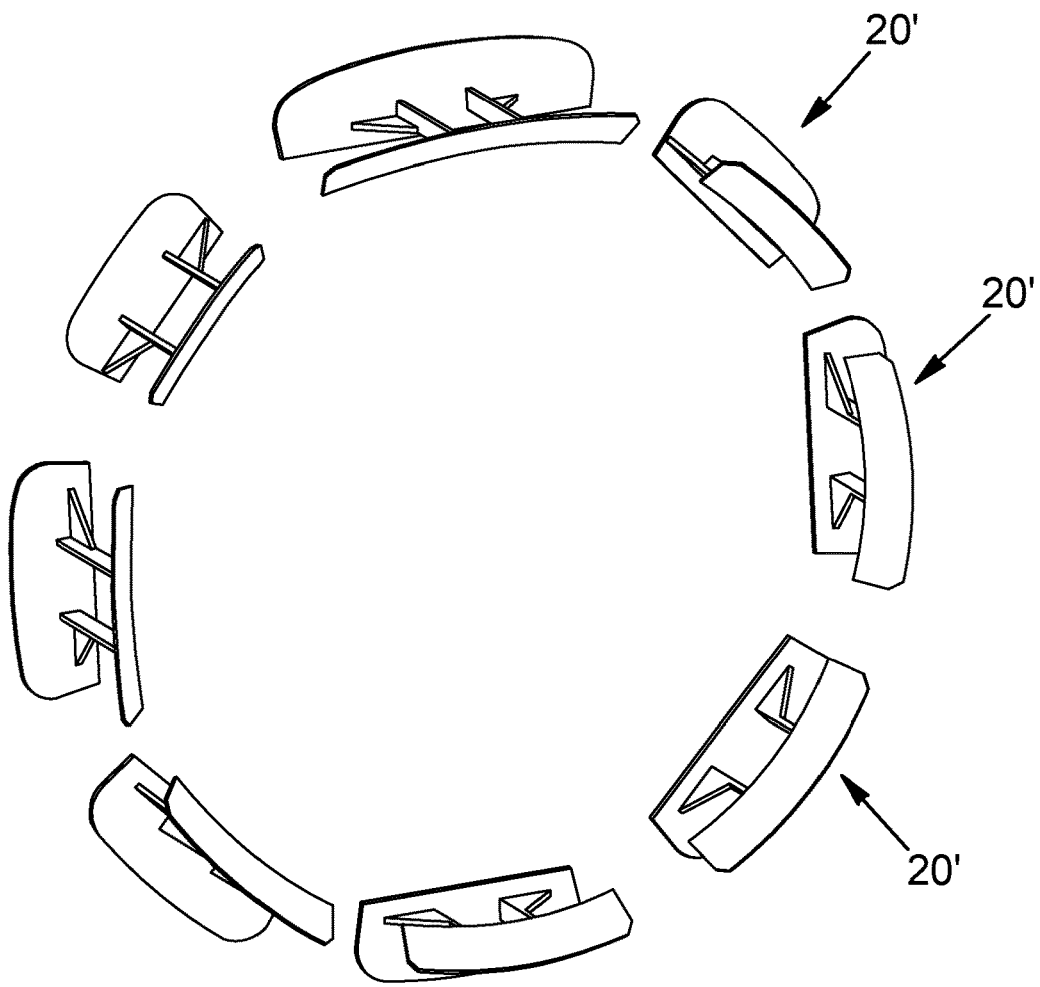
FIG. 4 shows how a plurality of deflectors may be spaced about the circumference of a rotating electrical machine.

FIG. 4 illustrates how a plurality of deflectors may be used in a rotating electrical machine. Referring to FIG. 4, in this example eight deflectors 20' are provided at spaced locations about the circumference of the machine. Adjacent deflectors are spaced at an angle of approximately 45° to each other in a circumferential direction. In this example, three different types of deflector are used, each of which has a width (in a tangential direction) which is different from that of the other types. This can allow the deflectors to deflect air flow from different sized air gaps caused by different spacings between adjacent landing bars. However, a single type of deflector or any other number of types of deflector could be used instead.

Providing the deflectors as segments in the way shown in FIGS. 2 to 4 can allow the deflectors to fit between the landing bars in the stator/frame air gap, and may facilitate manufacture and assembly.

Deflectors such as those shown in FIGS. 2 to 4 have been found to be effective in lowering the temperature of the stator end windings, and therefore in improving the machine cooling. However, a disadvantage of such deflectors is that they include multiple parts and require various manufacturing processes such as punching, machining and welding. Therefore, it has been found that they are relatively expensive to manufacture and may add considerable extra cost to a standard machine.

The present applicant has investigated various possible alternative deflector designs in an attempt to address the above problems.

Figure 5:
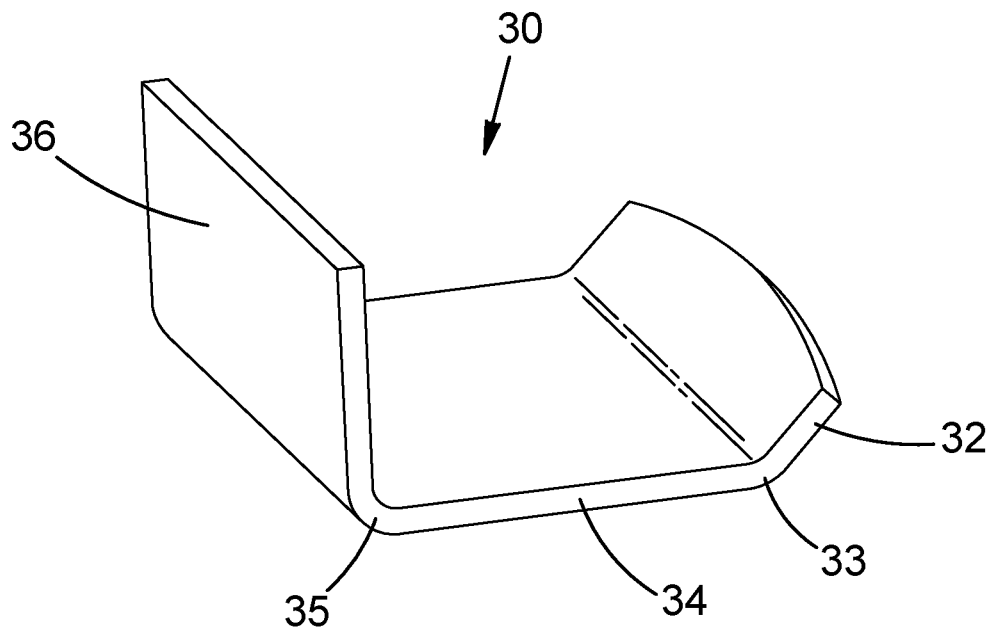
FIG. 5 shows a possible deflector design.

FIG. 5 shows one possible deflector design. The deflector shown in this example is made from a single sheet of material which is folded into shape. The sheet of material in this example is metal, although the deflector could be made from any other suitable material such as heat resistant plastic.

Referring to FIG. 5, the deflector 30 comprises a deflecting portion 32, a connecting portion 34 and an attachment portion 36. The attachment portion 36 comprises a plurality of bolt holes (not shown in FIG. 5) which are used to connect the deflector to the stator frame. The connecting portion 34 is used to extend the deflector inside the stator frame. The deflecting portion 32 is used to deflect air flow coming from the stator/frame air gap towards the stator end windings. The end of the deflecting portion 32 is curved, so as to fit inside the annular stator frame.

In FIG. 5, a first fold 33 forms a transition between the deflector portion 32 and the connecting portion 34. The angle between the deflector portion 32 and the connecting portion 34 is approximately 45°. A second fold 35 forms a transition between the connecting portion 34 and the attachment portion 36. The angle between the connecting portion 34 and the attachment portion 36 is approximately 90°. Each of the folds 38, 40 has a folding radius which is chosen to provide a reasonable quick transition from one portion to another, while avoiding excessive strain taking into account the properties of the material from which the deflector is made.

Figure 6:
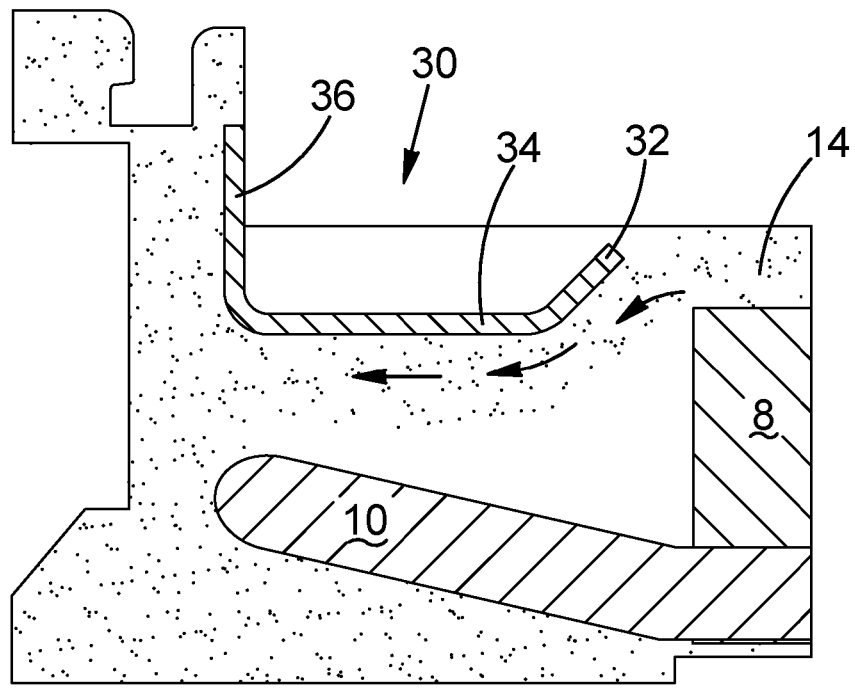
FIG. 6 illustrates results of tests performed using a deflector of the type shown in FIG. 5.

FIG. 6 illustrates the results of tests which were performed using a deflector of the type shown in FIG. 5. Referring to FIG. 6, the deflector 30 was positioned with the deflecting portion 32 facing air flow coming from the stator/frame air gap. As shown by the arrows in FIG. 6, the air flow exits the stator/frame air gap and is deflected downwards. However the air flow then returns to a substantially axial direction along the bottom surface of the connecting portion 34. As a consequence, very little air flow impinges on the stator end windings 10. This reduces the cooling effect of the air flow on the stator end windings.

Further investigation suggested that the behaviour of the air flow shown in FIG. 5 is due to the Coandă effect. The Coandă effect is a phenomenon in which a jet flow attaches itself to a nearby surface and remains attached even when the surface curves away from the initial jet direction.

Figure 7:
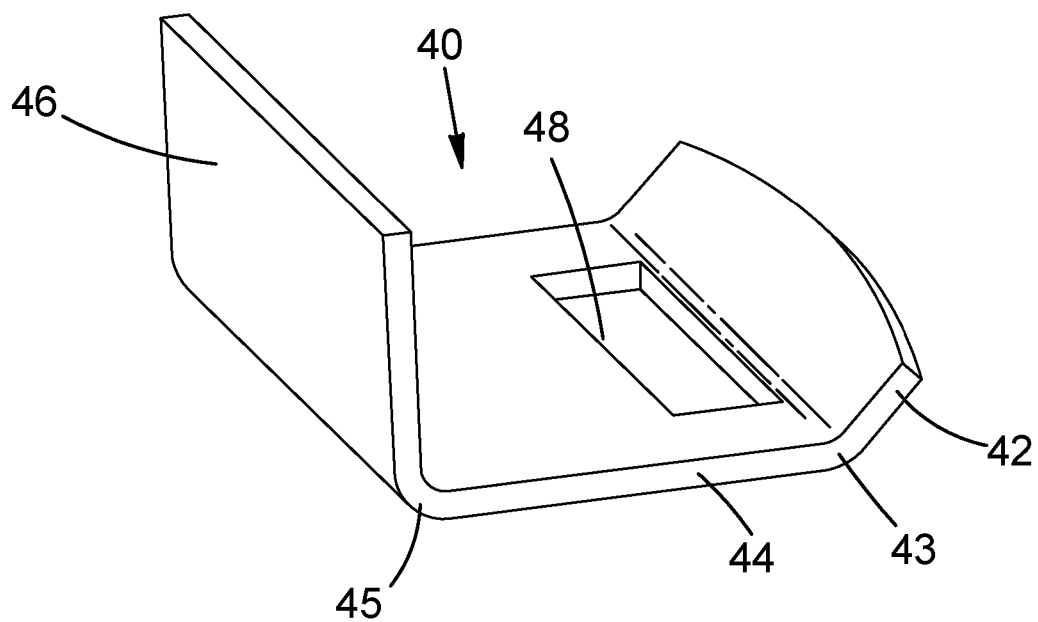
FIG. 7 shows a deflector design in an embodiment of the present invention.

FIG. 7 shows a deflector design in an embodiment of the present invention. The deflector of FIG. 7 is made from a single sheet of material which is folded into shape, in a similar way to the deflector of FIG. 5. However, the deflector of FIG. 7 is modified in order to reduce the Coandă effect. This is achieved by punching a hole in the connecting portion.

Referring to FIG. 7, the deflector 40 of this embodiment comprises a deflecting portion 42, a connecting portion 44 and an attachment portion 46. A first fold 43 forms a transition between the deflector portion 42 and the connecting portion 44. A second fold 45 forms a transition between the connecting portion 44 and the attachment portion 46. As in the deflector of FIG. 5, the attachment portion 46 is used to attach the deflector to the stator frame, the connecting portion 44 is used to extend the deflector inside the stator frame, and the deflecting portion 42 is used to deflect air flow coming from the stator/frame air gap towards the stator end windings.

In the deflector of FIG. 7, a hole 48 is punched in the connecting portion 44 next to the fold 43 between the deflector portion 42 and the connecting portion 44. Thus in this embodiment the hole is punched so as to keep the folding radius of the fold 43. The hole 48 is rectangular, with one edge extending along the edge of the fold 43. The hole extends in a width direction (i.e. a direction which is tangential to a circumference of the machine) for approximately 80% of the width of the deflector, with approximately 10% of the deflector material remaining on each side. The hole 48 extends in a length (axial) direction for approximately 30% of the length of the connecting portion. Of course, it will be appreciated that these figures are examples only, and may be adjusted to suit the particular circumstances.

Figure 8:
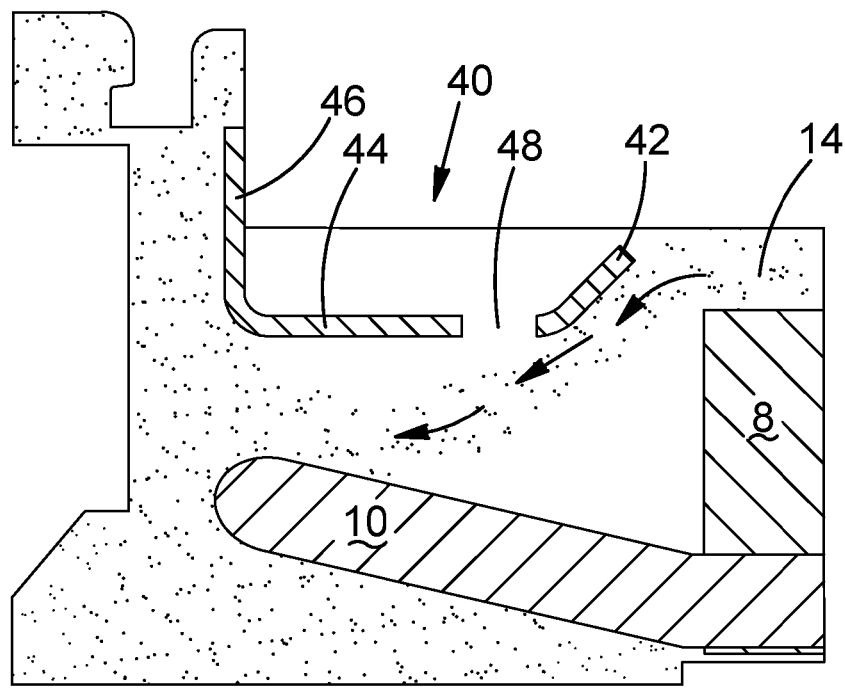
FIG. 8 illustrates results of tests performed using a deflector of the type shown in FIG. 7.

FIG. 8 illustrates the results of tests which were performed using a deflector of the type shown in FIG. 7. Referring to FIG. 8, the deflector 40 is positioned with the deflecting portion 42 facing air flow coming from the stator/frame air gap 14. As shown by the arrows in FIG. 8, the air flow exits the stator/frame air gap 14 and is deflected downwards by the deflecting portion 42. The presence of the hole 48 reduces the Coandă effect, and as a consequence the air flow continues in a downwards trajectory towards the stator end windings 10. Thus the design of the deflector 40 improves the impingement of air flow on the end windings 10, compared to the design of FIG. 5, thereby improving the cooling of the end windings.

The deflector of FIG. 7 may be formed by first stamping the deflector in a flat form from a sheet of material such as metal, then punching the aperture in the deflector, and then folding the deflector into the shape shown. Holes may then be drilled at the appropriate locations in the attachment portion 46 for attaching the deflector to the stator frame. This is a relatively simple and cost effective process which may avoid much of the complexity associated with producing the deflectors of FIGS. 2 to 4. Of course, it will be appreciated that other materials and manufacturing processes may be used as appropriate.

Figure 9:
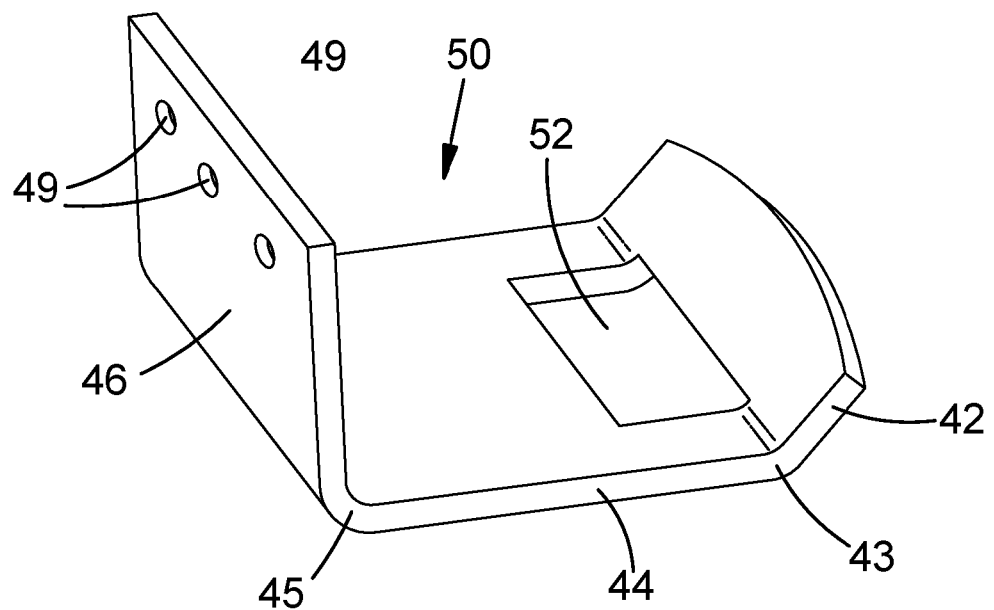
FIG. 9 shows a deflector design in another embodiment of the invention.

FIG. 9 shows a deflector design in another embodiment of the invention. Referring to FIG. 9, the deflector 50 of this embodiment comprises a deflecting portion 42, a connecting portion 44 and an attachment portion 46 which are similar to or the same as the corresponding portions of the deflector 40 of FIG. 7. However, in the embodiment of FIG. 9, a hole 52 is provided which removes the folding radius of the fold 43 between the connecting portion 44 and the deflecting portion 42. Also shown in FIG. 9 are holes 49 in the attachment portion 46 which are used to attach the deflector to the stator frame.

Figure 10:
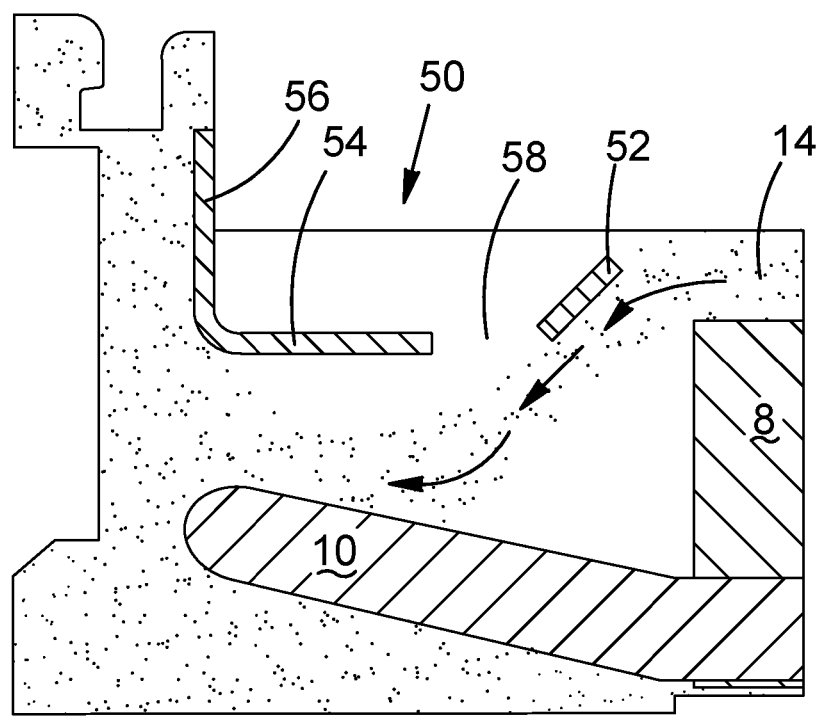
FIG. 10 illustrates results of tests performed using a deflector of the type shown in FIG. 9.

FIG. 10 illustrates the results of tests which were performed using a deflector of the type shown in FIG. 9. Referring to FIG. 10, the deflector 50 is positioned with the deflecting portion 42 facing air flow coming from the stator/frame air gap 14. As shown by the arrows in FIG. 10, the air flow exits the stator/frame air gap 14 and is deflected downwards by the deflecting portion 42. The presence of the hole 52 reduces the Coandă effect, and as a consequence the air flow continues in a downwards trajectory towards the stator end windings 10. The downward trajectory is more pronounced than that of FIG. 8, resulting in greater impingement of the air flow on the end windings.

When heat transfer coefficients were compared, it was found that the deflector design of FIG. 9 provided better cooling efficiency than that of FIG. 7. However both designs improved on the cooling efficiency compared to the design of FIG. 5.

Figure 11:
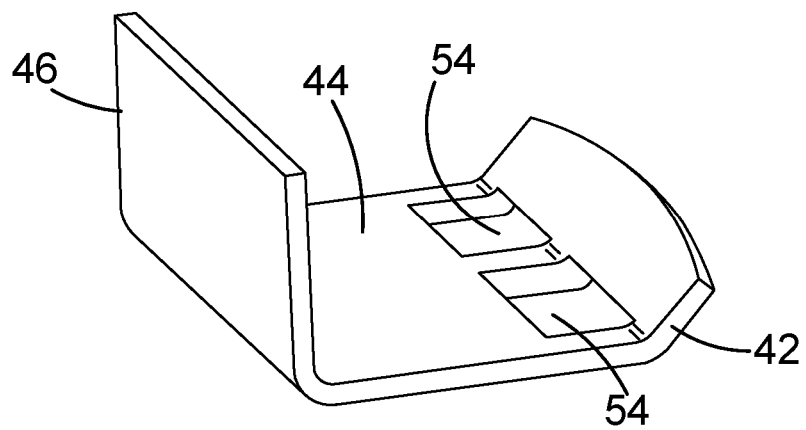
FIGS. 11 to 13 show deflector designs in other embodiments of the invention.

FIG. 11 shows a deflector design in another embodiment of the invention. Referring to FIG. 11, the deflector of this embodiment comprises a deflecting portion 42, a connecting portion 44 and an attachment portion 46 which are similar to or the same as the corresponding portions of the deflectors of FIGS. 7 and 9. However, in the embodiment of FIG. 11, two holes 54 are provided in the connecting portion 44 across the width of the connecting portion (perpendicular to the direction of air flow). In this example, both holes 54 remove the folding radius of the fold between the connecting portion 44 and the deflecting portion 42. This arrangement may be preferred where additional strength is required at the centre of the deflector.

Figure 12:
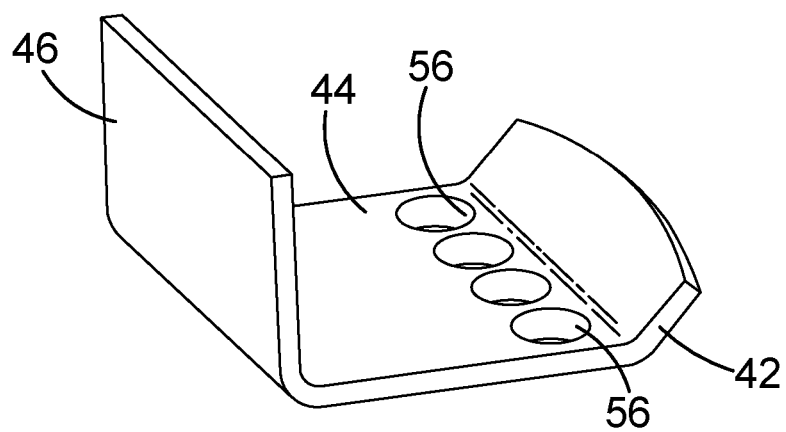

FIG. 12 shows a deflector design in another embodiment of the invention. Referring to FIG. 12, the deflector of this embodiment comprises a deflecting portion 42, a connecting portion 44 and an attachment portion 46 which are similar to or the same as the corresponding portions of the deflectors of the previous embodiments. However, in the embodiment of FIG. 12, four circular holes 56 are punched or drilled in the connecting portion 44 across the width of the connecting portion. It will be appreciated that a different number of holes could be provided. Furthermore, multiple holes could be provided in the length direction (parallel to the direction of air flow) as well as the width direction.

Figure 13:
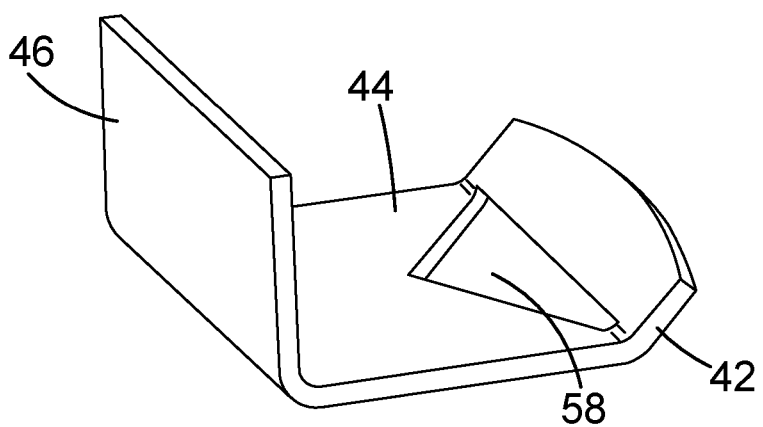

FIG. 13 shows a deflector design in another embodiment of the invention. Referring to FIG. 13, the deflector of this embodiment comprises a deflecting portion 42, a connecting portion 44 and an attachment portion 46 which are similar to or the same as the corresponding portions of the deflectors of the previous embodiments. However, in the embodiment of FIG. 13, a triangular hole 58 is provided in the connecting portion 44. One edge of the triangular hole 58 removes the folding radius of the fold between the connecting portion 44 and the deflecting portion 42. The other edges of the triangular hole 58 taper towards each other such that the width of the hole decreases with distance away from the fold. This may allow the reduction in the Coandă effect to be greater at the interface between the connecting portion 44 and the deflecting portion 42, where the Coandă effect would otherwise be the most pronounced.

Thus, in embodiments of the present invention, deflectors with a folded design are used instead of the deflectors shown in FIGS. 2 to 4. By using a folded design, the deflectors can be manufactured from a single sheet of material, thereby reducing the cost of the materials and simplifying the manufacturing process. One or more holes are punched or drilled in the connecting portion to reduce or avoid the Coandă effect, and thereby improve the impingement of cooling air on the stator end windings.

It will be appreciated that embodiments of the present invention have been described by way of example only, and variations in detail may be made within the scope of the appended claims. For example, any number of apertures could be provided across the width of the connecting member. Multiple small circular holes could be punched or drilled in the deflector in the vicinity of the fold between the connecting member and the deflecting member. The or each aperture may have any appropriate shape, such as a circle, an ellipse, a triangle, a trapezium, an isosceles trapezium, a kite, a pentagon, a hexagon, or a polygon with any other number of sides. The deflector may be made from materials other than metal such as heat resistant plastic. The deflector may be manufactured using other techniques such as injection moulding. Other modifications in detail will be apparent to the skilled person.

The invention claimed is:

1. A rotating electrical machine comprising:
a stator with stator end windings;
a housing;
a fan for drawing air through the rotating electrical machine; and
a plurality of deflectors arranged to deflect air flow exiting an air gap between the stator and the housing towards the stator end windings,
wherein each deflector comprises a sheet of material folded to form a deflecting portion and a connecting portion, the deflecting portion arranged to deflect air flow from the air gap between the stator and the housing towards the stator end windings, and the connecting portion comprising at least one aperture adjacent to the deflecting portion,
wherein the at least one aperture is arranged to reduce a tendency of the air flow to follow a surface of the deflector, and
wherein the total width of the at least one aperture is at least 50% of the width of the connecting portion.

2. A rotating electrical machine according to claim 1, wherein the at least one aperture is arranged to reduce the Coandă effect of air flow passing the surface of the deflector.

3. A rotating electrical machine according to claim 1, wherein the at least one aperture is located immediately after the deflecting portion in a direction of air flow.

4. A rotating electrical machine according to claim 1, wherein the at least one aperture is adjacent to or overlapping with a fold between the deflecting portion and the connecting portion.

5. A rotating electrical machine according to claim 1, wherein the at least one aperture removes at least some of a fold between the deflecting portion and the connecting portion.

6. A rotating electrical machine according to claim 1, wherein the length of the at least one aperture is at least 10% or 20% and less than 90% or 80% of the length of the connecting portion in a direction of air flow.

7. A rotating electrical machine according to claim 1, wherein the connecting portion comprises one aperture adjacent to the deflecting portion and the width of the aperture is at least 50% of the width of the connecting portion.

8. A rotating electrical machine according to claim 1, wherein the connecting portion comprises a plurality of apertures, and the sum of the widths of the apertures is at least 50% of the width of the connecting portion.

9. A rotating electrical machine according to claim 1, wherein the deflecting portion and the connecting portion are substantially flat.

10. A rotating electrical machine according to claim 1, wherein the deflecting portion lies in a plane which is at an angle to a plane of the connecting portion.

11. A rotating electrical machine according to claim 1, wherein the deflecting portion is at an angle to an axial direction of the rotating electrical machine.

12. A rotating electrical machine according to claim 1, wherein the deflecting portion is arranged to deflect air flow from a substantially axial direction to a direction with at least a radial component.

13. A rotating electrical machine according to claim 1, wherein an edge at the end of the deflecting portion is curved.

14. A rotating electrical machine according to claim 1, further comprising an attachment portion which attaches the deflector to the housing of the rotating electrical machine, wherein the connecting portion is between the deflecting portion and the attachment portion.

15. A rotating electrical machine according to claim 14, wherein the connecting portion is arranged to extend from the attachment portion inside the housing so as to locate the deflecting portion inside the housing.

16. A rotating electrical machine according to claim 1, wherein the deflector extends through a segment of the rotating electrical machine in a circumferential direction.

17. A rotating electrical machine according to claim 1, wherein the plurality of deflectors are provided in a spaced arrangement around a circumference of the rotating electrical machine.

18. A deflector for deflecting air flow in a rotating electrical machine comprising a stator, stator windings and a housing, the deflector comprising a sheet of material folded to form a deflecting portion and a connecting portion, wherein the deflecting portion is arranged to deflect air flow from a gap between the stator and the housing towards the stator windings, and the connecting portion comprises at least one aperture adjacent to the deflecting portion, wherein the at least one aperture is arranged to reduce a tendency of the air flow to follow a surface of the deflector, and the total width of the at least one aperture is at least 50% of the width of the connecting portion.

19. A method of deflecting air flow in a rotating electrical machine, the rotating electrical machine comprising a stator, stator windings and a housing, the method comprising deflecting air flow exiting from an air gap between the stator and the housing towards the stator windings using a deflector comprising a sheet of material folded to form a deflecting portion and a connecting portion, the connecting portion comprising at least one aperture adjacent to the deflecting portion, wherein the at least one aperture reduces a tendency of the air flow to follow a surface of the deflector, and the total width of the at least one aperture is at least 50% of the width of the connecting portion.

* * * * *